United States Patent [19]

Kakimoto et al.

[11] Patent Number: 4,694,032
[45] Date of Patent: Sep. 15, 1987

[54] PROCESS FOR PREPARING THERMOPLASTIC RESIN COMPOSITION

[75] Inventors: Osamu Kakimoto, Himeji; Fumiya Nagoshi, Kobe, both of Japan

[73] Assignee: Kanegaguchi Kagaku Kogyo Kabushiki Kaisha, Osaka, Japan

[21] Appl. No.: 795,778

[22] Filed: Nov. 7, 1985

[30] Foreign Application Priority Data

Nov. 8, 1984 [JP] Japan ............................ 59-235627

[51] Int. Cl.$^4$ ........................... C08K 5/19; C08K 5/20
[52] U.S. Cl. .................................... 523/334; 524/210; 524/217; 524/218; 524/458; 524/461; 525/77; 525/259; 525/315; 525/316
[58] Field of Search ................. 525/77, 259; 523/335, 523/334; 524/210, 217, 458, 461, 218

[56] References Cited

U.S. PATENT DOCUMENTS 3,010,936 11/1961 Irvin ....................................... 525/77
4,550,131 10/1985 Yats ....................................... 525/335

Primary Examiner—Jacob Ziegler
Attorney, Agent, or Firm—Antonelli, Terry & Wands

[57] ABSTRACT

A process for preparing a thermoplastic resin composition capable of giving delustered articles which comprises blending (A) 10 to 30 parts by weight of a graft-copolymer and (B) 90 to 70 parts by weight of a copolymer, the total amount of the components (A) and (B) being 100 parts by weight;

said graft-copolymer (A) being prepared by adding a nonionic or cationic polymer coagulant to (1) 70 to 95 parts by weight of diene rubber having a diene content of more than 50% by weight to give a coagulated diene rubber, and then graft-polymerizing (2) 30 to 5 parts by weight of at least one monomer selected from the group consisting a vinyl aromatic monomer, a vinyl cyanide and a methacrylic acid ester onto the coagulated diene rubber, the total amount of the components (1) and (2) being 100 parts by weight; said polymer (B) being prepared by polymerizing at least one monomer selected from the group consisting of an aromatic vinyl monomer, a vinyl cyanide, an acrylic acid ester and a methacrylic acid ester. The resin composition prepared by the invention not only can give shaped articles having the delustered surface but also has well-balanced heat resistance and impact strength.

7 Claims, No Drawings

PROCESS FOR PREPARING THERMOPLASTIC RESIN COMPOSITION

BACKGROUND OF THE INVENTION

The present invention relates to a process for preparing a thermoplastic resin composition capable of giving delustered products, and more particularly to a process for preparing a thermoplastic resin composition capable of giving shaped articles having delustered surface by blending (A) a graft-copolymer prepared by adding a nonionic or cationic polyacrylamide coagulant to a rubber-like diene polymer (hereinafter referred to as diene rubber) latex to coagulate a rubber particle, and then reacting coagulated rubber particles with at least one monomer selected from the group consisting of an aromatic vinyl monomer, a vinyl cyanide monomer and a methacrylic acid ester and (B) a polymer prepared from at least one monomer selected from the group consisting of an aromatic vinyl monomer, a vinyl cyanide monomer, an acrylic acid ester and a methacrylic acid ester.

An acrylonitrile/butadiene/styrene copolymer (ABS resin) can give shaped articles having an excellently glossy surface and have an excellent processability. Moreover, it has well-balanced heat resistance and impact resistance, and its cost is not high. Accordingly, the use of the ABS resin has been increased in various fields including parts for electric device, car parts and the like.

Recently, however, so-called delustered ABS resin that the glossiness of the ABS resin itself is controlled has been increasingly demanded for the use of car interior goods or the like, because shaped articles prepared from the delustered resin can give quiet feeling, high-grade feeling and car safety by controlling a reflection of light from a front-panel. Accordingly, there have been proposed various processes for preparing the ABS resin composition capable of giving delustered articles.

That is, there have been carried out, for instance, a process in which shaped articles are delustered by adding inorganic material such as silica or glass beads to an ABS resin composition, a process in which shaped articles having an uneven surface are molded by addition of a third component such as rubber or organic materials to give shaped articles having delustered surface, a mechanical process in which a mold or roll for wrinkling finish is employed, a process in which a paint is coated on a surface of shaped article, and the like.

However, in accordance with any delustering processes by addition of inorganic or organic materials to a resin composition, suitable shaped articles cannot be obtained. That is, in case of the delustering process by addition of the inorganic material, the delustering property of the inorganic material is unsatisfactory, and moreover the impact strength of the shaped article lowers. In case of the delustering process by addition of the organic material, the heat resistance and weatherability of the obtained composition are lower or the processability of the composition is poor unless the obtained shaped article has unsatisfactory delustered surface or unevenly delustered surface. In case of the delustering process by employing the mold or roll for wrinkling finish or the flat paint, the processing cost is high.

An object of the present invention is to provide a process for preparing a thermoplastic resin composition capable of avoiding the above-mentioned conventional problems as well as capable of giving sufficiently delustered shaped articles.

A further object of the present invention is to provide an easy process for preparing a thermoplastic resin composition capable of giving delustered shaped articles.

These and other objects of the present invention will become apparant from the description hereinafter.

SUMMARY OF THE INVENTION

In accordance with the present invention, there is provided a process for preparing a thermoplastic resin composition capable of giving delustered articles which comprises blending (A) 10 to 30 parts by weight of a graft-copolymer and (B) 90 to 70 parts by weight of a polymer, the total amount of the components (A) and (B) being 100 parts by weight;

the graft-copolymer (A) being prepared by adding at least one polymer coagulant selected from the group consisting of a coagulant having the formula (I):

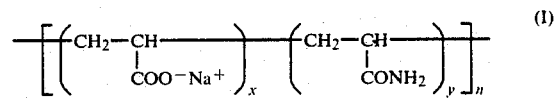

wherein x is 0 to 5% by mole, y is 100 to 95% by mole and n is an integer which gives a molecular weight of 1,000 to 13,000,000, a coagulant having the formula (II):

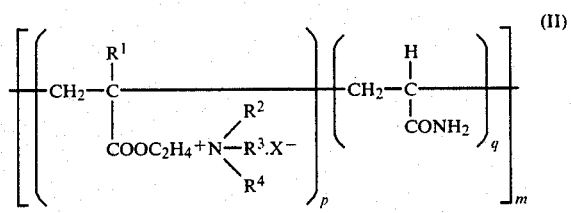

wherein $R^1$ is hydrogen atom or methyl group, $R^2$ is hydrogen atom or a lower alkyl group having 1 or 2 carbon atoms, $R^3$ and $R^4$ are same or different and each is a lower alkyl group having 1 or 2 carbon atoms, X is a counter anion, p is 2 to 100% by mole, q is 98 to 0% by mole and m is an integer which gives a molecular weight of 200 to 6,000,000 and a coagulant having the formula (III):

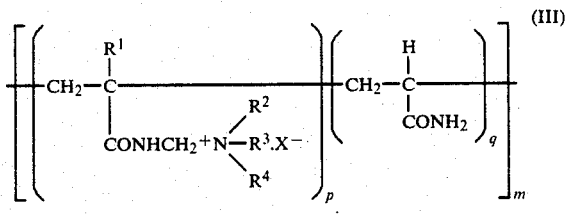

wherein $R^1$, $R^2$, $R^3$, $R^4$, p, q and m are as defined above, to (1) 70 to 9 parts by weight (solid content) of a latex of a diene rubber having a diene content of more than 50% by weight to give a coagulated diene rubber latex, and then graft polymerizing (2) 30 to 5 parts by weight of at least one monomer selected from the group consisting of a vinyl aromatic monomer, a vinyl cyanide monomer and a methacrylic acid ester onto the coagulated diene rubber, the total amount of the components (1) and (2) being 100 parts by weight, the amount of the polyacrylamide coagulant being from 0.01 to 0.5 part by weight per 100 parts by weight of the total amount of the components (1) and (2);

the polymer (B) being prepared by polymerizing at least one monomer selected from an aromatic vinyl monomer, a vinyl cyanide monomer, an acrylic acid ester and a methacrylic acid ester.

DETAILED DESCRIPTION

In the present invention, the thermoplastic resin composition capable of giving articles having delustered surfaces is prepared by blending 10 to 30 parts by weight of the graft-copolymer (A) obtained by adding 0.01 to 0.5 part by weight, preferably 0.05 to 0.2 parts by weight of the polyacrylamide coagulant to 70 to 95 parts by weight of diene rubber, stirring the mixture, and then reacting the coagulated diene rubber latex with 30 to 5 parts by weight of at least one monomer selected from the group consisting of an aromatic vinyl monomer, a vinyl cyanide monomer and a methacrylic acid ester and 90 to 70 parts by weight of the polymer (B) prepared from at least one monomer selected from the group consisting of an aromatic vinyl monomer, a vinyl cyanide monomer, an acrylic acid ester and methacrylic acid ester. The resin composition prepared by the present invention can give shaped articles having sufficiently delustered surface and can solve the above-mentioned conventional disadvantages.

The coagulants employed in the invention are non-ionic and cationic polyacrylamide flocculants having the formula (I),

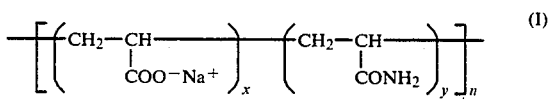

wherein x is 0 to 5% by mole, y is 100 to 95% by mole and n is an integer which gives a molecular weight of 1,000 to 13,000,000, nonionic and cationic polyacrylamide coagulants having the formula (II):

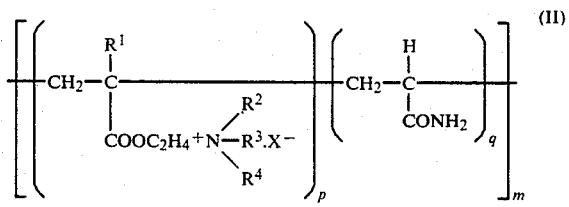

wherein $R^1$ is hydrogen atom or methyl group, $R^2$ is hydrogen atom or a lower alkyl group having 1 or 2 carbon atoms, $R^3$ and $R^4$ are same or different and each is a lower alkyl group having 1 or 2 carbon atoms, X is a counter anion, p is 2 to 100% by mole, q is 98 to 0% by mole and m is an integer which gives a molecular weight of 200 to 6,000,000, and nonionic and cationic polyacrylamide coagulants having the formula (III):

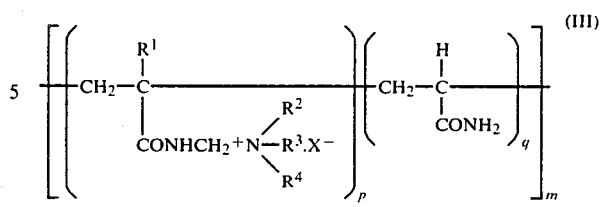

wherein $R^1$, $R^2$, $R^3$, $R^4$, X, p, q and m are as defined above.

The amount of the polyacrylamide coagulant added to the diene rubber latex varies depending on the quality or state of the diene rubber latex. Generally, the coagulant is employed in a very small amount, i.e. from 0.01 to 0.5 part by weight, preferably from 0.01 to 0.2 part by weight, more preferably from 0.05 to 0.15 part by weight based on 100 parts by weight of the total amount of the diene rubber and at least one monomer selected from the group consisting of a vinyl aromatic monomer, a vinyl cyanide monomer and a methacrylic acid ester. When the amount of the coagulant is less than 0.01 part by weight, the obtained resin composition cannot give sufficiently delustered shaped articles because of lowering the delustering property. On the other hand, when the amount of the coagulant is more than 0.5 part by weight, not only the effect of the invention cannot be obtained but also the mechanical stability of the coagulated diene rubber latex is impaired.

The diene rubbers having the diene content of more than 50% by weight are employed in the invention. Examples thereof include, for instance, butadiene polymer, isoprene polymer, chloroprene polymer, butadiene styrene copolymer, butadiene acrylonitrile copolymer, and the like. The diene rubber employed alone or in admixture thereof. A gel content of the diene rubber is not particularly limited. However, from the point of properties of the obtained composition, it is preferable to employ the diene rubber in the gel content of more than 50% by weight. A particle size of the diene rubber is not limited, and generally, the diene rubber having a particle size of 0.05 to 1.0μ may be employed. The diene rubber latex may include other additives such as emulsifier.

Typical examples of the aromatic vinyl monomer employed in the invention are, for instance, styrene, α-methylstyrene, vinyltoluene, o-ethylstyrene, o-, m- or p-methylstyrene, and the like. Typical examples of the vinyl cyanide monomer are, for instance, acrylonitrile, methacrylonitrile, and the like. Typical examples of the acrylic acid ester are, for instance, methyl acrylate, ethyl acrylate, n-butyl acrylate, and the like, and typical examples of the methacrylic acid ester are, for instance, methyl methacrylate, ethyl methacrylate, n-butyl methacrylate, and the like.

In the present invention, the graft-copolymer (A) is prepared from 70 to 95 parts by weight (solid content) of the latex of the diene rubber and 30 to 5 parts by weight of at least one monomer selected from the group consisting of the aromatic vinyl monomer, the vinyl cyanide monomer and the methacrylic acid ester. The total amount of the diene rubber and the monomer is 100 parts by weight.

When the amount of the diene rubber is more than 95 parts by weight, the obtained resin composition is not sufficient in not only impact strength but also weatherability. On the other hand, when the amount of the diene rubber is less than 70 parts by weight, the delustering property is poor and the rubber particles are coagulated to form too coarse particles, because the latex becomes unstable upon conducting the graft-polymerization.

Conventional polymerization methods are applicable to preparation of the diene rubber latex. That is to say, the diene rubber latex can be obtained by emulsion polymerization of a conjugated diene monomer or a mixture of a conjugated diene monomer and a vinyl group-containing monomer copolymerizable with the conjugated diene monomer. The diene rubber latex may include usual additive such as emulsion stabilizer. Also, conventional graft-polymerization methods are applicable to preparation of the graft-copolymer (A) obtained by reacting the monomer with the diene rubber latex. That is to say, the graft-copolymer (A) can be obtained by emulsion graft-polymerization of a monomer or a monomer mixture having a desired composition in the presence of the diene rubber latex treated with the coagulant. The graft-copolymer may include usual additive such as stabilizer. Moreover, the polymer (B) obtained by polymerizing at least one monomer selected from the group consisting of the aromatic vinyl monomer, the vinyl cyanide monomer, the acrylic acid ester and the methacrylic acid ester can be prepared by employing conventional polymerization methods. That is, the polymer (B) can be obtained by the emulsion polymerization, the suspension polymerization, the bulk polymerization, and the like of a monomer or a monomer mixture having a desired composition.

The thermoplastic resin composition of the present invention is prepared from 10 to 30 parts by weight of the graft-copolymer (A) and 90 to 70 parts by weight of the polymer (B), which are blended so that the total amount of the components (A) and (B) is 100 parts by weight. When the amount of the component (A) is more than 30 parts by weight, the obtained resin composition cannot give shaped articles having excellent surface. On the other hand, when the amount of the component (B) is more than 90 parts by weight, the obtained resin composition cannot give shaped articles having sufficiently delustered surface as shown in the belowmentioned Examples and Comparative Examples.

The shaped articles prepared by the thermoplastic resin composition of the invention are excellent in surface state and have sufficiently delustered surface.

The present invention is more specifically described and explained by means of the following Examples in which all percents and parts are by weight unless otherwise noted. It is to be understood that the present invention is not limited to the Examples, and various changes and modifications may be made in the invention without departing from the spirit and scope thereof.

REFERENCE EXAMPLE 1

(1) Preparation of a graft-copolymer (A)

TABLE 1

| Diene rubber latex | 70 to 95 parts (as solid matter) |
|---|---|
| Water | 250 to 280 parts |
| Acrylonitrile | 10 to 1.5 parts |
| Styrene | 20 to 3.5 parts |
| Sodium formaldehyde sulfoxylate | 0.4 part |
| Ethylene diaminetetraacetic acid disodium salt | 0.01 part |
| Ferrous sulfate | 0.0025 part |
| Cumene hydroperoxide | 0.32 parts |
| Aqueous coagulant solution | 0.01 to 0.2 parts |

A polymerization vessel was charged with the diene rubber latex and water in proportion shown in Table 1 and the mixture was stirred at 60° C. for 40 to 60 minutes under nitrogen gas. After the aqueous solution of polyacrylamide coagulant having a content of 0.5 to 1% was added to the mixture so as to be the predetermined amount shown in Table 1.

The mixture was stirred for about 1 hour. Then, sodium formaldehyde sulfoxylate, ethylene diaminetetraacetic acid disodium salt and ferrous sulphate were added to the reaction mixture in amounts shown in Table 1. After the monomer mixture (styrene and acrylonitrile) and the initiator (cumene hydroperoxide) were added continuously for 3 hour to the above reaction mixture, the polymerization was carried out for 1 hour.

Various graft-copolymers (A) were prepared in the above-mentioned manner by employing coagulants, diene rubber latex and monomers shown in Table 2.

TABLE 2

| Graft-copolymer (A) | Coagulant kind | Amount (part) | Diene rubber Kind | Amount (part) | Monomer Kind | Amount (part) |
|---|---|---|---|---|---|---|
| Graft-copolymer (A-1) | Sanpoly K220*1 | 0.1 | Polybutadiene*4 | 70 | Styrene Acrylonitrile | 20 10 |
| Graft-copolymer (A-2) | Sanpoly N500*2 | 0.1 | Polybutadiene*4 | 70 | Styrene Acrylonitrile | 20 10 |
| Graft-copolymer (A-3) | Sanpoly N500*2 | 0.05 | Polybutadiene*4 | 70 | Styrene Acrylonitrile | 20 10 |
| Graft-copolymer (A-4) | Sanpoly N500*2 | 0.2 | Polybutadiene*4 | 70 | Styrene Acrylonitrile | 20 10 |
| Graft-copolymer (A-5) | Sanpoly N500*2 | 0.1 | Polybutadiene*4 | 70 | Styrene Acrylonitrile | 20 10 |
| Graft-copolymer (A-6) | Sanpoly A520*3 | 0.1 | Polybutadiene*4 | 70 | Styrene Acrylonitrile | 20 10 |
| Graft-copolymer (A-7) | Sanpoly A500*2 | 1 | Polybutadiene*4 | 70 | Styrene Acrylonitrile | 20 10 |
| Graft-copolymer (A-8) | — | — | Polybutadiene*4 | | Styrene Acrylonitrile | 20 10 |

(Note)
*1 A cationic polyacrylamide coagulant made by Sankyo Kasei Kabushiki Kaisha
*2 A nonionic polyacrylamide coagulant made by Sankyo Kasei Kabushiki Kaisha
*3 A anionic polyacrylamide coagulant made by Sankyo Kasei Kabushiki Kaisha
*4 Mooney Viscosity: 70 to 80, Gel content: 85%

(2) Preparation of a polymer (B)

Monomers such as styrene, α-methylstyrene, acrylonitrile and methyl methacrylate were mixed in kinds and amounts shown in Table 3, and the emulsion polymerization was carried out to give a polymer (B).

TABLE 3

| Polymer (B) | Monomer Kind | Amount (part) |
| --- | --- | --- |
| Polymer (B-1) | Acrylonitrile | 30 |
|  | α-Methylstyrene | 70 |
| Polymer (B-2) | Acrylonitrile | 20 |
|  | α-Methylstyrene | 50 |
|  | Methyl methacrylate | 15 |
|  | Styrene | 15 |

A reactor equipped with a stirrer was charged with 250 parts of water and 3 parts of sodium oleate and the temperature was maintained at 65° C. After the space in the reactor was displaced with nitrogen gas to remove oxygen gas, the reactor was charged with 0.4 part of sodium formaldehyde sulfoxylate, 0.01 part of ethylene diaminetetraacetic acid disodium salt and 0.0025 part of ferrous sulfate. Then the prescribed amount of the monomers shown in Table 3 was continuously added to the reactor with 0.3 part of an initiator and the polymerization was completed.

EXAMPLES 1 TO 5 AND COMPARATIVE EXAMPLES 1 TO 3

Thus obtained graft-copolymer (A) was blended with the polymer (B) in latex state in the amount shown in Table 4 and the mixture was stirred. A rubber content of the mixture was controlled to 19 to 20 parts. After the obtained latex was coagulated with a coagulant, the filtration, the water-washing and the air-drying were carried out.

An antioxidant, a stabilizer, a lubricant or a pigment was added to the obtained resin composition and a pellet was prepared by employing a vent type pelletizer. A sample (thickness: 3 m/m, size: 150 cm×150 cm) was prepared from the obtained pellet by employing an injection molding machine having an injection capacity of 5 ounces. Molding condition: Mold temperature: 40° C.; Molding temperature: 250° to 255° C.

With respect to the obtained sample, the 60°-mirror reflectivity and the Izod-impact strength were measured. The 60°-mirror reflectivity was measured according to American Society for Testing Materials (ASTM) D523 and the Izod-impact strength was measured according to ASTM D256.

The results are shown in Table 4.

TABLE 4

|  | Graft-copolymer (A) | | Polymer (B) | | 60°-Mirror reflectivity (%) | Izod-impact strength (kgcm · cm) |
| --- | --- | --- | --- | --- | --- | --- |
|  | Kind | Amount (part) | Kind | Amount (part) |  |  |
| Ex. 1 | Graft-copolymer (A-1) | 28 | Polymer (B-1) | 72 | 23.5 | 14 |
| Ex. 2 | Graft-copolymer (A-2) | 28 | Polymer (B-1) | 72 | 45 | 13 |
| Ex. 3 | Graft-copolymer (A-3) | 28 | Polymer (B-1) | 72 | 49 | 14 |
| Ex. 4 | Graft-copolymer (A-4) | 28 | Polymer (B-1) | 72 | 50 | 12.5 |
| Ex. 5 | Graft-copolymer (A-5) | 28 | Polymer (B-2) | 72 | 43.2 | 13.2 |
| Com. Ex. 1 | Graft-copolymer (A-6) | 28 | Polymer (B-1) | 72 | 88 | 13.0 |
| Com. Ex. 2 | Graft-copolymer (A-7) | 28 | Polymer (B-1) | 72 | 90 | 12.5 |
| Com. Ex. 3 | Graft-copolymer (A-8) | 28 | Polymer (B-1) | 72 | 86 | 15.0 |

From the result of Table 4, it is observed that when the cationic and nonionic polyacrylamide coagulants are employed as a coagulant in the graft-copolymer (A) (Examples 1 and 2), the obtained resin composition can give shaped articles having the delustered surfce, however when the anionic polyacrylamide coagulant is employed (Comparative Example 1), the obtained resin composition cannot give shaped articles having the delustered surface. On the other hand, when the amount of the nonionic or cationic polyacrylamide coagulants is from 0.05 to 0.2 part (Examples 2 to 5), the obtained resin compositions can give shaped articles having delustered surface, however, the amount of the coagulant is 1 part (Comparative Example 2) or the coagulant is not employed (Comparative Example 3), the obtained resin composition cannot give shaped article having the delustered surface.

REFERENCE EXAMPLE 2

(1) Preparation of graft-copolymer (A)

A graft-copolymer (A) was prepared in the same manner as in Reference Example 1 except that a diene rubber latex, monomers and a coagulant were employed in kinds and amounts shown in Table 5.

TABLE 5

|  | Flocculant | | Diene rubber latex | | Monomer | |
| --- | --- | --- | --- | --- | --- | --- |
|  | Kind | Amount (part) | Kind | Amount (part) | Kind | Amount (part) |
| Graft-copolymer (A-9) | Sanpoly K220 | 0.1 | Polybutadiene[1] | 70 | Styrene | 20 |
|  |  |  |  |  | Acrylonitrile | 10 |
| Graft-copolymer (A-10) | Sanpoly N500 | 0.1 | Polybutadiene[1] | 70 | Styrene | 20 |
|  |  |  |  |  | Acrylonitrile | 10 |
| Graft-copolymer (A-11) | Sanpoly N500 | 0.1 | Polybutadiene[1] | 85 | Styrene | 10.5 |
|  |  |  |  |  | Acrylonitrile | 4.5 |
| Graft-copolymer | Sanpoly N500 | 0.1 | Polybutadiene[1] | 95 | Styrene | 3.5 |

TABLE 5-continued

|  | Flocculant | | Diene rubber latex | | Monomer | |
|---|---|---|---|---|---|---|
|  | Kind | Amount (part) | Kind | Amount (part) | Kind | Amount (part) |
| (A-12) Graft-copolymer | Sanpoly N500 | 0.1 | Polybutadiene*1 | 50 | Acrylonitrile | 1.5 |
| (A-13) Graft-copolymer | Sanpoly N500 | 0.1 |  | 100 | Styrene Acrylonitrile | 35 15 |
| (A-14) Graft-copolymer | Sanpoly N500 | 0.1 |  | 100 | — | — |

(Note)
*1 Mooney Viscosity: 70 to 80, Gel content: 85%

EXAMPLES 6 TO 9 AND COMPARATIVE EXAMPLES 4 AND 5

The procedure of Example 1 was repeated except that the graft-copolymer (A) prepared in Reference Example 2 and the polymer (B) were blended in amount shown in Table 6.

With respect to the obtained samples, the 60°-mirror reflectivity, the Izod-impact strength and the weatherability were measured. The difference between the hue of the obtained sample and the hue of the sample treated in a Fade-O-meter (made by Atlas Electric Devices Co.) at 83° C. for 400 hours was measured according to the type ND-1010 of the Tunter Color and Color Difference Meter 101 D (made by Nippon Denshoku Kogyo Co., Ltd.) and the difference was shown as the weatherability.

The results are shown in Table 6.

TABLE 6

|  | Graft-copolymer (A) | | Polymer (B-1) Amount (part) | 60°-Mirror reflectivity (%) | Izot-impact strength (kg · cm/cm) | Weatherability (Hue difference) |
|---|---|---|---|---|---|---|
|  | Kind | Amount (part) | | | | |
| Ex. 6 | Graft-copolymer (A-9) | 28 | 72 | 23.5 | 14 | 1.7 |
| Ex. 7 | Graft-copolymer (A-10) | 28 | 72 | 45 | 13 | 1.8 |
| Ex. 8 | Graft-copolymer (A-11) | 22 | 78 | 37.5 | 12.5 | 1.8 |
| Ex. 9 | Graft-copolymer (A-12) | 20 | 80 | 30.5 | 5.7 | 2.0 |
| Com. Ex. 4 | Graft-copolymer (A-13) | 38 | 62 | 78 | 15 | 1.7 |
| Com. Ex. 5 | Graft-copolymer (A-14) | 20 | 80 | 35.2 | 3.5 | 2.7 |

From the result of Table 6, it is observed that when the amount of the diene rubber latex is from 70 to 95 parts (Examples 6 to 9), the obtained resin composition not only can give shaped articles having the delustered surface but also have excellent impact strength and weatherability. However, when the amount of the diene rubber latex is les than 70 parts (Comparative Example 4), the obtained resin composition cannot give shaped articles having the delustered surface. On the other hand, when the amount of the diene rubber latex is more than 95 parts (Comparative Example 5), the obtained resin composition is poor in the impact strength and the weatherability.

REFERENCE EXAMPLE 3

(1) Preparation of a graft-copolymer (A)

A graft-copolymer (A-15) was prepared in the same manner as in Reference Example 1 except that 85 parts of polybutadiene was employed as diene rubber, 0.1 part of Sanpoly K220 was employed as the coagulant and 10.5 parts of styrene and 4.5 parts of acrylonitrile were employed as monomers.

EXAMPLES 10 TO 12 AND COMPARATIVE EXAMPLES 6 AND 7

The procedure of Example 1 was repeated except that the graft-copolymer (A-15) and the polymer (B-1) were blended in amounts shown in Table 7.

The 60°-mirror reflectivity of the obtained samples was measured in the same nammer as in Example 1 and the surface state of the samples was estimated by observing with the nacked eye as to whether flow mark or jetting occures on the surface of samples or not.

From the result of Table 7, it is observed that when the amount of the graft-copolymer (A) is more than 30 parts, the surface state of the molded article is worse, on the other hand, the amount of the graft-copolymer (A) is less than 10 parts, the obtained resin composition cannot give shaped articles having delustered surface.

Accordingly, it is preferable that the graft-copolymer (A) and the polymer (B) are blended in a blending proportion of 10/90 to 30/70 parts for obtaining the molded article having not only the delustered surface but also the excellent surface.

TABLE 7

|  | Graft-copolymer (A-15) Amount (part) | Polymer (B-1) Amount (part) | 60°-Mirror reflectivity (%) | Surface state of sample* |
|---|---|---|---|---|
| Ex. 10 | 20 | 80 | 20.1 | ⊚ |
| EX. 11 | 10 | 90 | 31.5 | ⊚ |
| Ex. 12 | 30 | 70 | 14.3 | ○ |
| Com. Ex. 6 | 40 | 60 | 13.5 | X |
| Com. Ex. 7 | — | 100 | 92 | ⊚ |

(Note)
*Estimation
⊚: No silver streak being observed and no weld mark being observed
○: No silver streak being observed and little weld mark observed
X: Silver streak being observed and weld mark being clearly observed

What we claim is:

1. A process for preparing a thermoplastic resin composition capable of giving delustered articles which comprises blending (A) 10 to 30 parts by weight of a graft-copolymer and (B) 90 to 70 parts by weight of a polymer, the total amount of the components (A) and (B) being 100 parts by weight;

said graft-copolymer (A) being prepared by adding at least one polymer coagulant selected from the group consisting of a coagulant having the formula (I):

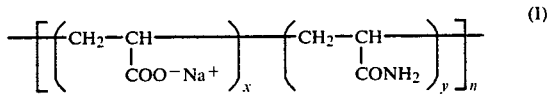

wherein x is 0 to 5% by mole, y is 100 to 95% by mole and n is an integer which gives a molecular weight of 1,000 to 13,000,000, a coagulant having the formula (II):

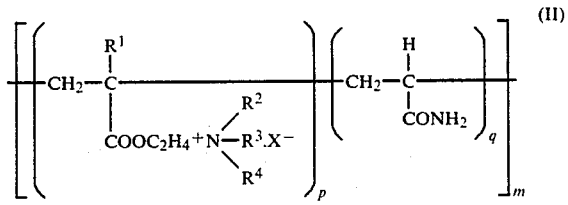

wherein $R^1$ is hydrogen atom or methyl group, $R^2$ is hydrogen atom or a lower alkyl group having 1 or 2 carbon atoms, $R^3$ and $R^4$ are same or different and each is a lower alkyl group having 1 or 2 carbon atoms, X is a counter anion, p is 2 to 100% by mole, q is 98 to 0% by mole and m is an integer which gives a molecular weight of 200 to 6,000,000, and a coagulant having the formula (III):

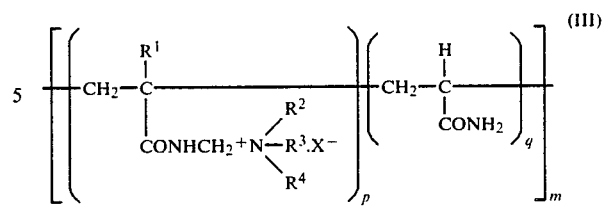

wherein $R^1$, $R^2$, $R^3$, $R^4$, X, p, q and m are as defined above, to (1) 70 to 95 parts by weight (solid content) of a latex of a diene rubber having a diene content of more than 50% by weight to give a coagulated diene rubber, and then graft-polymerizing (2) 30 to 5 parts by weight of at least one monomer selected from the group consisting of a vinyl aromatic monomer, a vinyl cyanide monomer and a methacrylic acid ester onto the coagulated diene rubber, the total amount of the components (1) and (2) being 100 parts by weight, and the amount of said polymer coagulant being from 0.01 to 0.5 part by weight per 100 parts by weight of the total amount of the components (1) and (2);

said polymer (B) being prepared by polymerizing at least one monomer selected from the group consisting of an aromatic vinyl monomer, a vinyl cyanide monomer, an acrylic acid ester and a methacrylic acid ester.

2. The process of claim 1, wherein an amount of said polymer coagulant is from 0.01 to 0.2 parts by weight.

3. The process of claim 1, wherein an amount of said polymer coagulant is from 0.05 to 0.15 part by weight.

4. The process of claim 1, wherein said at least one polymer coagulent is the coagulent having the formula (I).

5. The process of claim 1, wherein said at least one polymer coagulant is the coagulant having the formula (II).

6. The process of claim 1, wherein said at least one polymer coagulant is the coagulant represented by the following formula

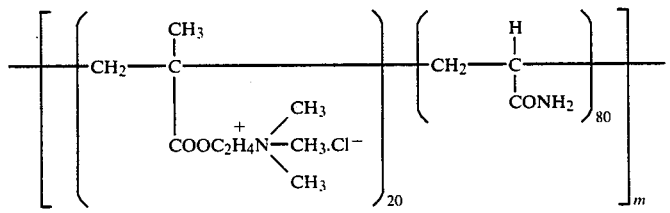

wherein m has a value such that the molecular weight of the compound is 3,000,000.

7. The process of claim 5, wherein said graft polymer is one wherein the polymeric substrate is polybutadiene and the polymerized components onto the substrate are styrene and acrylonitrile.

* * * * *